US010618753B2

(12) United States Patent
Hopkins et al.

(10) Patent No.: US 10,618,753 B2
(45) Date of Patent: Apr. 14, 2020

(54) SKATE SYSTEM AND MOVABLE PLATFORM

(71) Applicant: Innovative Logistics, Inc., Fort Smith, AR (US)

(72) Inventors: Stonie Hopkins, Fort Smith, AR (US); Mark Bradley, Fort Smith, AR (US); Jos den Teuling, Staarten (NL)

(73) Assignee: INNOVATIVE LOGISTICS, INC., Fort Smith, AR (US)

( * ) Notice: Subject to any disclaimer, the term of this patent is extended or adjusted under 35 U.S.C. 154(b) by 71 days.

(21) Appl. No.: 15/798,801

(22) Filed: Oct. 31, 2017

(65) Prior Publication Data
US 2018/0118541 A1 May 3, 2018

Related U.S. Application Data

(60) Provisional application No. 62/414,945, filed on Oct. 31, 2016.

(51) Int. Cl.
*B65G 67/20* (2006.01)
*B66F 9/12* (2006.01)
(Continued)

(52) U.S. Cl.
CPC .......... *B65G 67/20* (2013.01); *B62B 3/0618* (2013.01); *B65G 67/02* (2013.01); *B66F 9/122* (2013.01); *B62B 2203/22* (2013.01)

(58) Field of Classification Search
CPC ....... B62B 3/06; B62B 3/0618; B62B 3/0625; B62B 3/0643; B62B 2203/22; B65G 67/20; B65G 67/02; B66F 9/122
(Continued)

(56) References Cited

U.S. PATENT DOCUMENTS 1,531,407 A * 3/1925 Johnson ............. F27B 17/0016
254/5 C
2,678,139 A 5/1954 Gildersleeve
(Continued)

FOREIGN PATENT DOCUMENTS

CA 2144886 A1 9/1996
CN 203520452 4/2014
(Continued)

OTHER PUBLICATIONS

International Search Report and Written Opinion dated Jan. 25, 2018, from the corresponding International Application No. PCT/US2017/059094, 15 sheets.
(Continued)

*Primary Examiner* — James Keenan
(74) *Attorney, Agent, or Firm* — Katten Muchin Rosenman LLP

(57) ABSTRACT

The present invention provides a movable platform (MP) having a simple construction that is capable of being conveyed by a hydraulically actuated skate system (HASS). The MP is able to accommodate freight placed upon its surface and can be used to fully load a trailer in a single cross-dock move. The HASS can be used to move the MP during cross-dock operations. The HASS comprises a plurality of tines which are received in corresponding support channels in the MP. The tines are used to lift the MP off the ground and rollers on the tines can be used to move the MP. A conveyance vehicle is used to move the HASS and the MP after the tines have been actuated.

12 Claims, 14 Drawing Sheets

(51) Int. Cl.
*B65G 67/02* (2006.01)
*B62B 3/06* (2006.01)

(58) Field of Classification Search
USPC .......................................................... 254/5 C
See application file for complete search history.

(56) References Cited

U.S. PATENT DOCUMENTS

| | | | |
|---|---|---|---|
| 3,091,477 A * | 5/1963 | Johnstone | B62B 3/0606 104/135 |
| 3,610,580 A | 10/1971 | Johnstone | |
| 3,667,635 A | 6/1972 | Hackney | |
| 3,938,678 A | 2/1976 | Kern | |
| 3,958,701 A * | 5/1976 | Yatagai | B60P 1/52 414/349 |
| 4,231,695 A | 11/1980 | Weston, Sr. | |
| 4,427,331 A * | 1/1984 | Grebenstein | B65G 7/04 414/277 |
| 5,011,358 A | 4/1991 | Anderson et al. | |
| 5,454,672 A | 10/1995 | Halpin et al. | |
| 5,799,585 A | 9/1998 | Brennan, Jr. et al. | |
| 5,839,372 A * | 11/1998 | Kordel | B65G 67/20 104/307 |
| 6,186,728 B1 * | 2/2001 | Michaud | B62B 3/0631 254/10 R |
| 6,529,797 B2 | 3/2003 | Williams et al. | |
| 6,575,686 B2 | 6/2003 | Hagenzieker | |
| 6,669,089 B2 | 12/2003 | Cybulski et al. | |
| 6,698,655 B2 | 3/2004 | Kondo et al. | |
| 6,808,356 B2 * | 10/2004 | Iwasaki | B60P 1/52 193/35 SS |
| 7,030,760 B1 | 4/2006 | Brown | |
| 7,101,139 B1 | 9/2006 | Benedict | |
| 7,327,262 B2 | 2/2008 | Motteram et al. | |
| 7,603,299 B1 | 10/2009 | Dewey, Jr. et al. | |
| 7,739,147 B2 | 6/2010 | Branigan et al. | |
| 7,742,745 B2 | 6/2010 | Twitchell, Jr. | |
| 7,826,920 B2 | 11/2010 | Stevens et al. | |
| 7,991,505 B2 | 8/2011 | Lert, Jr. et al. | |
| 8,442,879 B2 | 5/2013 | Dewey, Jr. et al. | |
| 8,491,240 B2 | 7/2013 | Baker | |
| 8,626,540 B2 | 1/2014 | Peterkofsky et al. | |
| 8,731,708 B2 | 5/2014 | Shakes et al. | |
| 8,744,884 B2 | 6/2014 | Benda et al. | |
| 8,972,045 B1 | 3/2015 | Mountz et al. | |
| 9,367,827 B1 | 6/2016 | Lively et al. | |
| 10,124,927 B2 * | 11/2018 | Bradley | B62B 3/002 |
| 2005/0071234 A1 | 3/2005 | Schon | |
| 2006/0015532 A1 | 1/2006 | Mizell | |
| 2007/0136079 A1 | 6/2007 | Beykirch et al. | |
| 2007/0156491 A1 | 7/2007 | Schuler et al. | |
| 2007/0174148 A1 | 7/2007 | Schuler et al. | |
| 2007/0279224 A1 | 12/2007 | Branigan | |
| 2008/0103944 A1 | 5/2008 | Hagemann et al. | |
| 2008/0167817 A1 | 7/2008 | Hessler et al. | |
| 2009/0267770 A1 | 10/2009 | Twitchell, Jr. | |
| 2010/0108760 A1 | 5/2010 | Eccleston | |
| 2011/0274523 A1 | 11/2011 | Petalas | |
| 2012/0101956 A1 | 4/2012 | Hyre et al. | |
| 2012/0112904 A1 | 5/2012 | Nagy | |
| 2012/0191272 A1 | 7/2012 | Andersen et al. | |
| 2014/0277691 A1 | 9/2014 | Jacobus et al. | |

FOREIGN PATENT DOCUMENTS

| | | | | |
|---|---|---|---|---|
| DE | 2951271 A1 | 7/1981 | | |
| EP | 1897749 A2 | 3/2008 | | |
| EP | 2581292 A1 | 4/2013 | | |
| EP | 2 845 823 A1 | 3/2015 | | |
| FR | 2890064 A1 * | 3/2007 | | B62B 3/06 |
| GB | 2340819 A | 3/2000 | | |
| JP | 07-069458 A | 3/1995 | | |
| JP | 2002331926 A * | 11/2002 | | B65G 67/20 |
| JP | 2009073494 A | 4/2009 | | |
| KR | 10-2014-0101117 A | 8/2014 | | |
| WO | 2014/072434 A1 | 5/2014 | | |

OTHER PUBLICATIONS

H&M Bay Deploys RFID solution at cross-docketing distribution center, RFID24-7Com, Mar. 30, 2010.
3PL Adds Customer Value with RFID, Sato Eueope, Megatrux, Inc., Rancho Cucamonga, California, (Feb. 15, 2015).
"Maida Napolitano", Contributing editor, Crossdocking: The latest and greatest, Article from Logistics Management, MMH Editorial, Apr. 1, 2010.
K. Choy, Et. Al., Cross-dock job assignment problem in space-constrained industrial logistics distribution hubs with single docking zone, Taylor & Francis Online, International Journal of Production Research, vol. 50, Issue 9, 2012, Special Issue: International logistics systems: theory and applications.
G. Miragliotta, Et. Al., A quantitative model for the introduction of RFId in the fast moving consumer goods supply chain: Are there any profits?, International Journal of Operations & Production Management, ISSN: 0144-3577, Online from 1980, Subject Area: Management Science & Operations.
J Wang, Et. Al., Real-time trailer scheduling for crossdock operations, Transportation Journal 47.2, (Apr. 2008-Jun. 2008): 5(16).
Transmittal; International Search Report; and the Written Opinion of the International Searching Authority for International Application No. PCT/US2015/065775 dated Mar. 30, 2016.

* cited by examiner

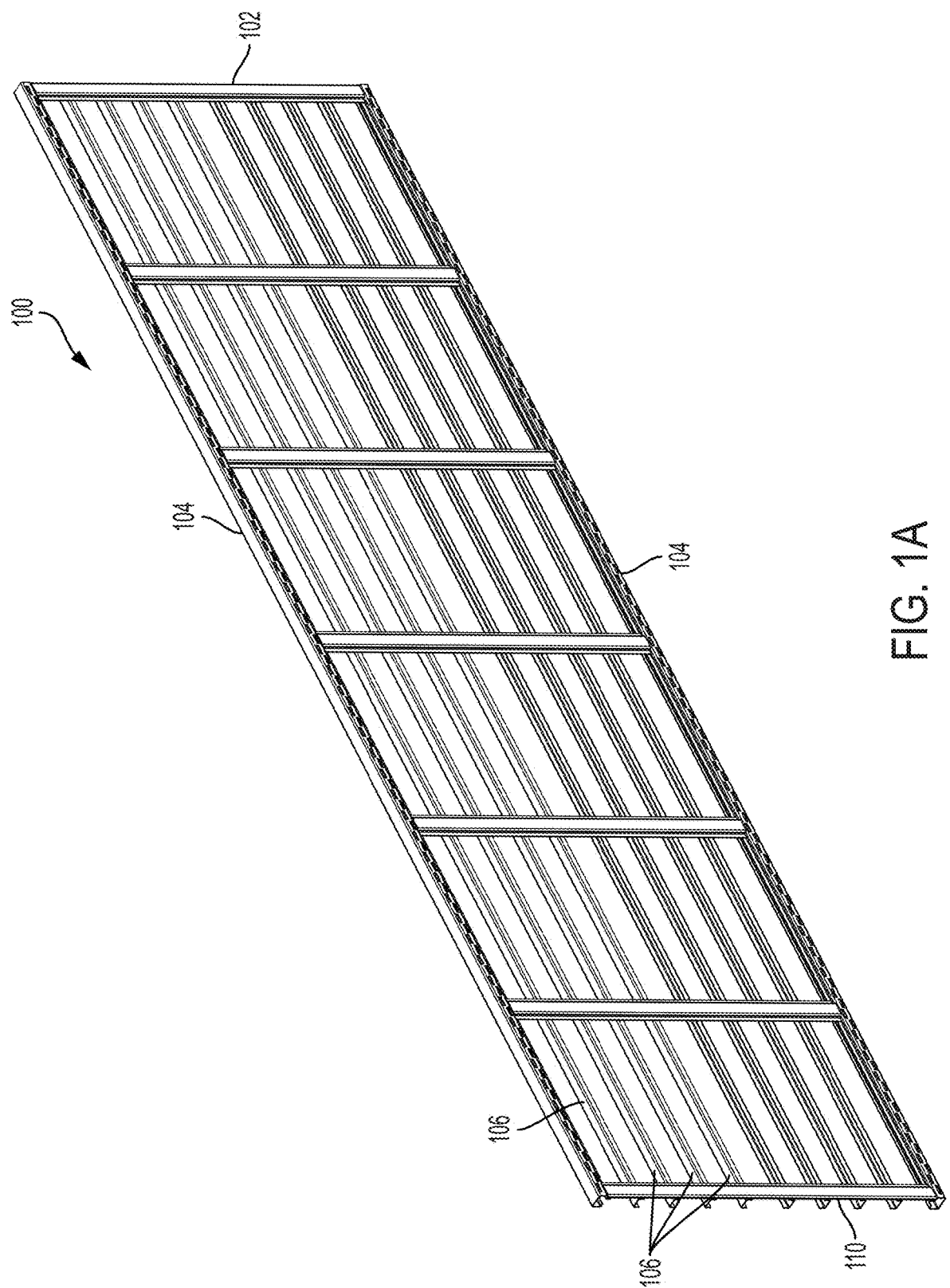

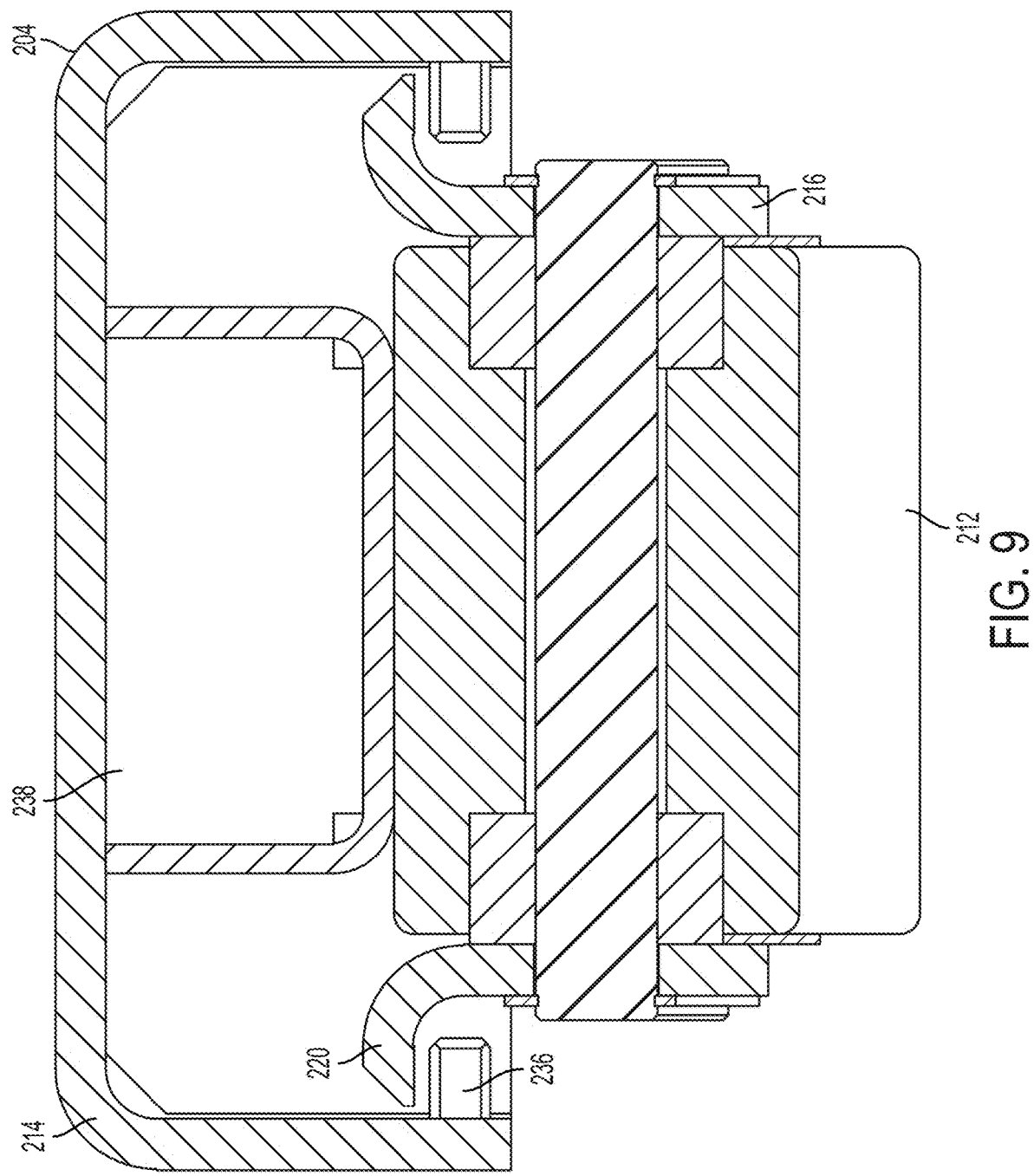

SKATE SYSTEM AND MOVABLE PLATFORM

CROSS-REFERENCE TO RELATED APPLICATIONS

The present invention claims priority to U.S. Provisional Application Ser. No. 62/414,945, filed Oct. 31, 2016, the entire content of which is hereby incorporated by reference in its entirety.

RELATED APPLICATIONS

The present invention can be utilized in any standard or custom warehouse. Particularly, the MP of the present invention can be utilized with the systems and methods described in related U.S. Pat. No. 9,367,827, issued Jun. 14, 2016 and U.S. Provisional Application Ser. No. 62/415,054, filed Oct. 31, 2016, both of which are incorporated by reference in their entirety.

FIELD OF THE INVENTION

The present invention provides a hydraulically actuated skate system (HASS) used to raise/lower and convey a movable platform (MP) with a load of freight into/out of a trailer. More particularly, the present invention provides a HASS MP that can be maneuvered through a warehouse using a standard 4,000 pound capacity forklift.

BACKGROUND

The trucking industry, specifically the segment consisting of Full-Truckload (FTL) and Less-than-truckload (LTL), is a segment of the shipping industry that ships a wide array of freight. The shipment sizes can vary from an individual item consisting of one piece to a full truckload consisting of several pieces. FTL freight is typically handled only once as it is loaded into a semi-trailer at the shipper's location and unloaded at the consignee's location. In the LTL industry, freight is commonly handled multiple times, with the shipper loading the freight into a semi-trailer, then the freight is returned to a local freight terminal to be unloaded/loaded into a another trailer to be routed to the destination. This process, commonly known as a hub-and-spoke network, is used to increase the efficiency of the operation by increasing density.

The traditional method of loading freight into a semi-trailer is to back a semi-trailer to a raised dock and unload each piece/pallet using a forklift. A 53' semi-trailer van can hold up to 30 pallets on the floor of the trailer. To unload a loaded semi-trailer conventionally, it requires a single fork-lift driver to drive into the trailer to pick-up and remove each pallet. During this unloading process, a driver could take up to 30 trips into the trailer to remove each pallet. This process is typically completed utilizing 1 forklift driver but it is possible to utilize 2 forklift drivers to unload a trailer simultaneously.

As should be apparent, this process is wasteful in that the forklift is often not conveying cargo (empty carries). Also, because the trailer is not connected to the dock, the forklift driver must be careful each time that they enter the trailer. This further reduces the speed of the process. Therefore, there is clearly a need for a HASS MP which can be easily unloaded from a trailer in a single move without the forklift driver having to enter the trailer. As will be made apparent in the following disclosure, the present invention provides a solution for these aforementioned problems.

SUMMARY

The present invention provides a MP having a simple construction that is capable of being conveyed by a HASS. The MP is able to accommodate freight placed upon its surface and can be used to fully load a trailer in a single cross-dock move. The HASS can be used to move the MP during cross-dock operations. The HASS comprises a plurality of tines which are received in corresponding support channels in the MP. The tines are used to lift the MP off the ground and rollers on the tines can be used to move the MP. A conveyance vehicle is used to move the HASS and the MP after the tines have been actuated.

BRIEF DESCRIPTION OF THE DRAWINGS

These and other advantages of the present invention will be readily understood with the reference to the following specifications and attached drawings wherein:

FIG. 1A depicts a perspective view of the MP without decking.

FIG. 9 depicts a side cross-sectional view of a portion of a tine in the expanded position.

DETAILED DESCRIPTION

Figure 1B:
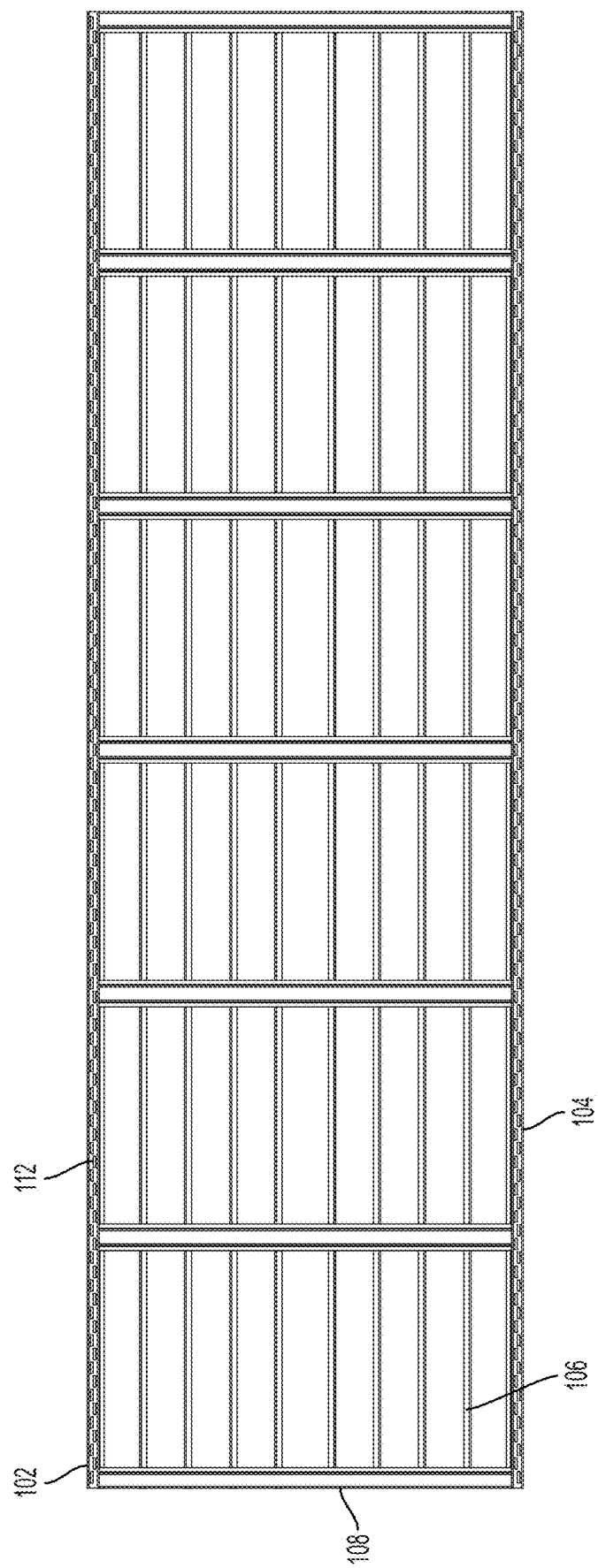
FIG. 1B depicts a top view of the MP of FIG. 1A.

Preferred embodiments of the present invention will be described hereinbelow with reference to the accompanying drawings. In the following description, well-known functions or constructions are not described in detail because they may obscure the invention in unnecessary detail. While the present invention is generally directed to LTL operations for use in the trucking industry, the teachings may be applied to other shipping industries, such as those by air, sea, and rail. Therefore, the teachings should not be constructed as being limited to only the trucking industry.

Referring first to FIG. 1A, depicted is a top perspective view of movable platform (MP) 100 without decking. As shown, frame 102 of MP 100 generally comprises two runners 104, eight evenly spaced longitudinal beams 106, and seven evenly spaced cross beams 108. It should be apparent to one of ordinary skill in the art that the number and/or spacing of longitudinal beams 106 and/or cross beams 108 can be varied depending upon the needs of MP 100. The longitudinal beams 106 are arranged such that a plurality of support channels 110 are formed. The cross beams 108 form part of a top surface of MP 100 as will be shown later. The combination of runners 104, longitudinal beams 106, and cross beams 108 provide the majority of the structural support for MP 100 to hold freight. All of the components of frame 102 are constructed from channel or rectangular metal segments (e.g., aluminum or steel) which are welded or bolted together to form the frame 102. The portion of longitudinal beams 106 that rest on the ground may have an L-shape to provide more surface area for ground contact.

Figure 1C:
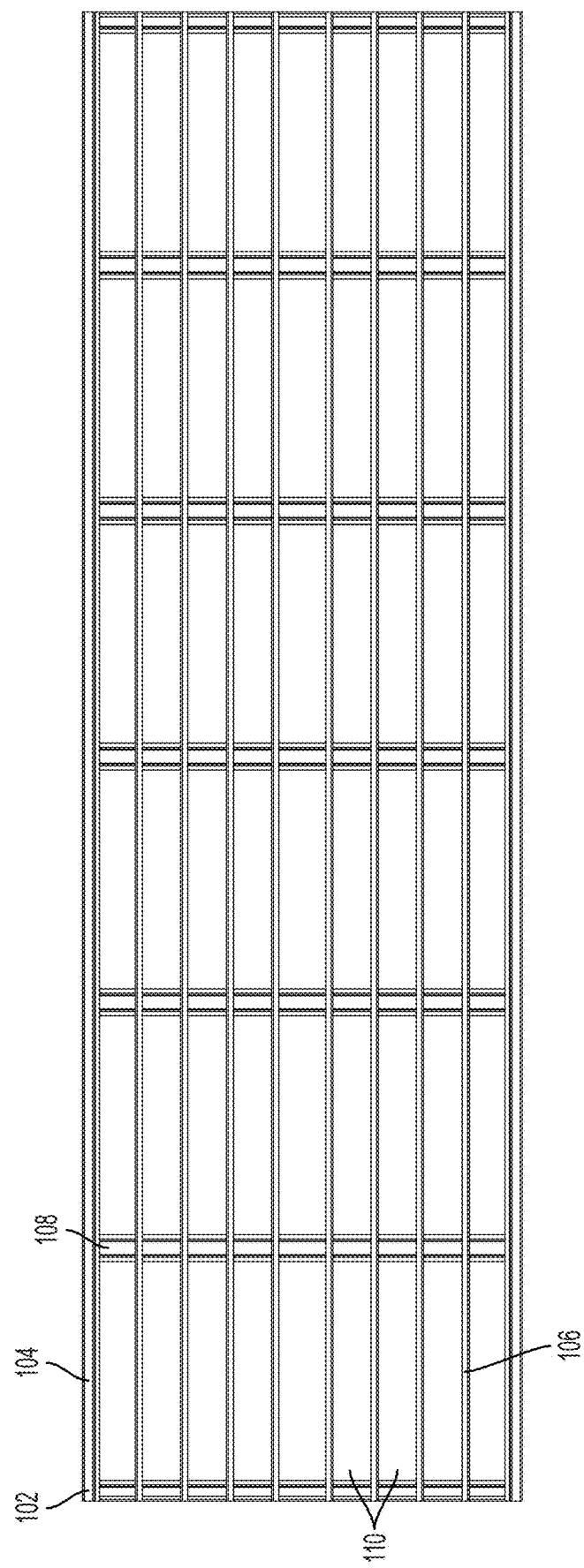
FIG. 1C depicts a bottom view of the MP of FIG. 1A.

FIGS. 1B and 1C depict top and bottom views, respectively, of frame 102 of FIG. 1A. As is more clearly shown in FIG. 1B, the runners 104 may comprise a plurality of slots 112 in a top surface. Slots 112 can be used to place securement, such as straps or webbing, to secure freight placed on MP 100. Slots 112 may also be larger to accommodate upright posts attached to the frame 102.

MP 100 preferably has a height of 4" or less when resting on the ground and 5" or less when raised to limit impact on load capacity in a trailer. MP 100 is designed to be loaded with up to 24,000 pounds of freight. MP 100 is designed to be conveyed with a standard 4,000 pound capacity forklift to unload/load MP 100 in and out of a trailer.

MPs 100 can be stacked up to eight high in a pup trailer, allowing more economical shipping from the manufacturer or for repositioning of MPs 100 from one hub/spoke to another in an LTL network. Generally, MP 100 is 26' in length, allowing it to fit into a standard pup trailer which has an interior length of 27.5' or two MPs 100 can fit into a van trailer which has an interior length of 52.5'. Preferably, the width of MP 100 can be modified to fit either a roll door trailer (92" MP width for a 93" wide door opening) or a swing door trailer (96" MP width for a 97" wide opening). It should be apparent to one of ordinary skill in the art that these dimensions can be modified to fit any global standard of trailer or for any custom trailer.

Figure 1D:
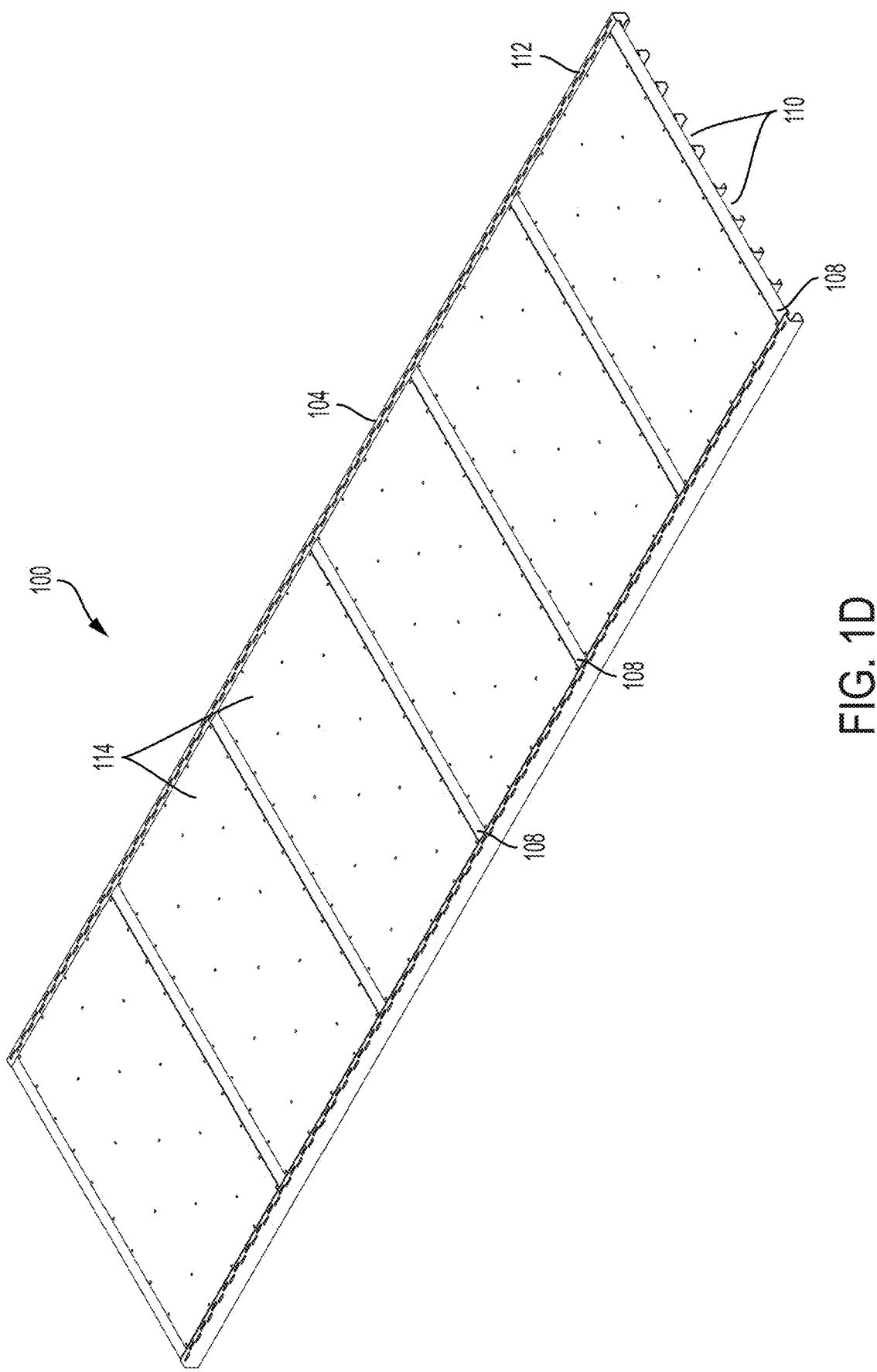
FIG. 1D depicts a perspective view of the MP with decking.

FIG. 1D depicts the MP 100 of FIGS. 1A-1C with decking 114 secured between cross beams 108. The upper surface of longitudinal beams 106 provides support for decking 114 when freight is placed on MP 100. Decking 114 is preferably a lightweight material, such as plywood or plastic, which prevents smaller freight from falling through the frame 102. The MP 100 is designed to allow a standard 4,000 lb. forklift to drive on the MP 100 to unload/load freight conventionally, if needed. It should be apparent that decking 114 may also be a metal mesh or other material if weight of MP 100 is a priority.

Figure 2A:
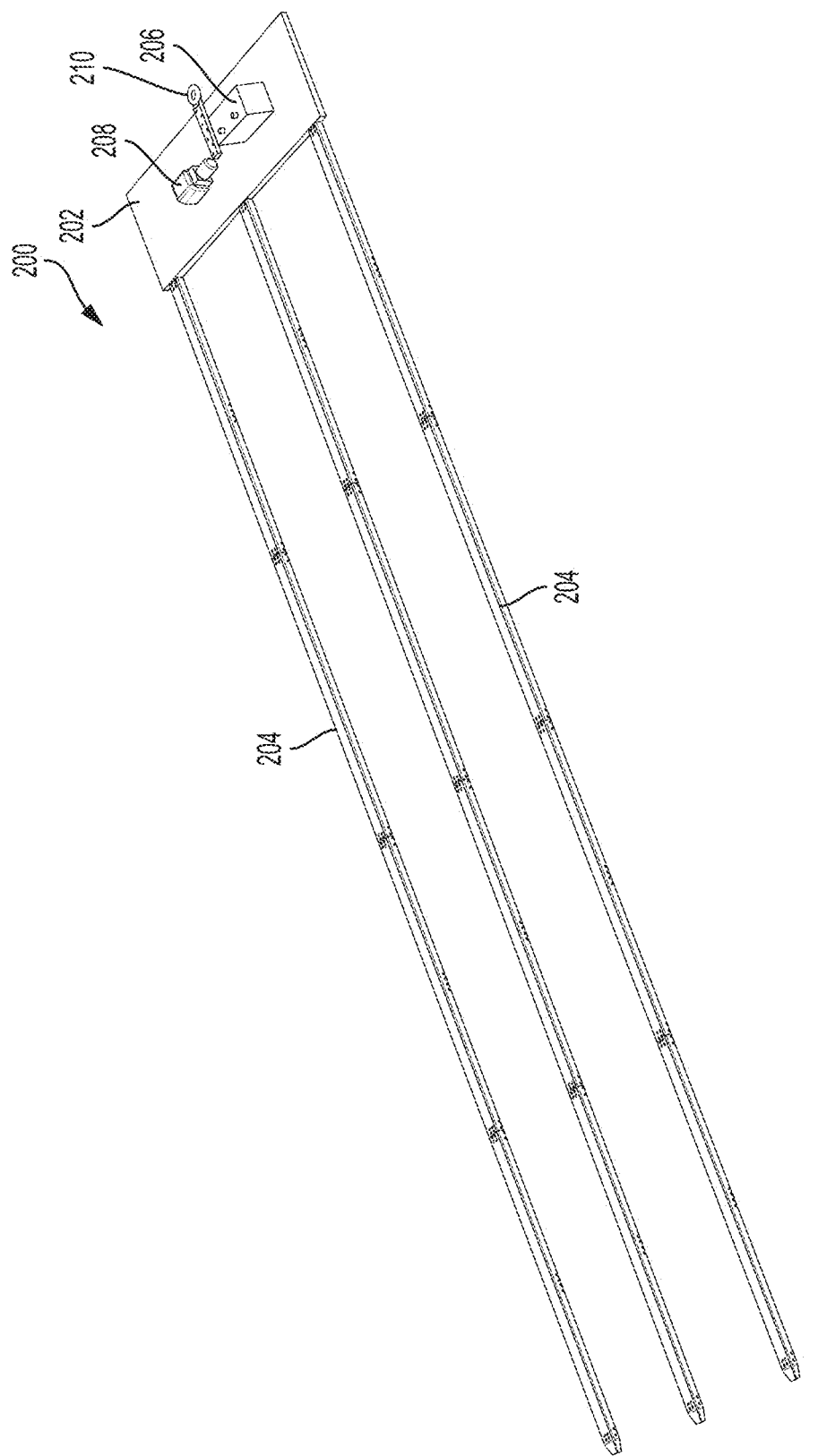
FIG. 2A depicts a perspective view of the HASS.

Described next is HASS 200 used to convey MP 100 in and out of trailers during cross-dock operations. As shown in FIG. 2A, HASS 200 comprises platform 202 and three (or more) tines 204. Platform 202 houses a power supply 206 and hydraulic assembly 208 which is used to raise/lower tines 104 to lift MP 100 as will be explained later. The bottoms of tines 204 contain a plurality of rollers (not currently shown) which allow HASS 200 to be conveyed when in the raised or lowered position. Platform 202 further comprises attachment 210 which is used to connect HASS 200 to a conveyance vehicle, such as a forklift. Attachment 210 may take any form factor so that HASS 200 can be conveyed by any conveyance vehicle having a compatible attachment.

Figure 2B:
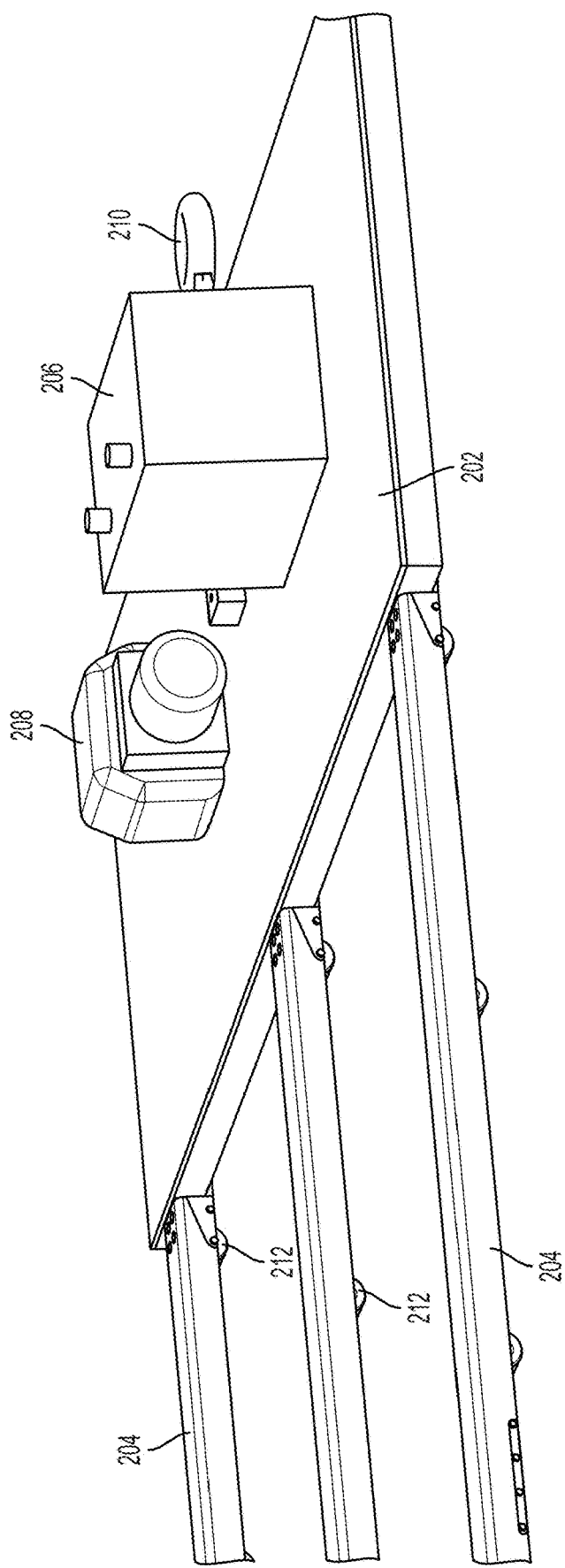
FIG. 2B depicts an enhanced view of the HASS showing the platform in detail.

FIG. 2B depicts the connection between platform 202 and tines 204. As shown, tines 204 are rigidly connected to platform 204, preferably through a bolted plate, L-brackets, or another similar fastening mechanism. In this view, a plurality of rollers 212 can be seen protruding from the bottom surface of tines 204.

Figure 3A:
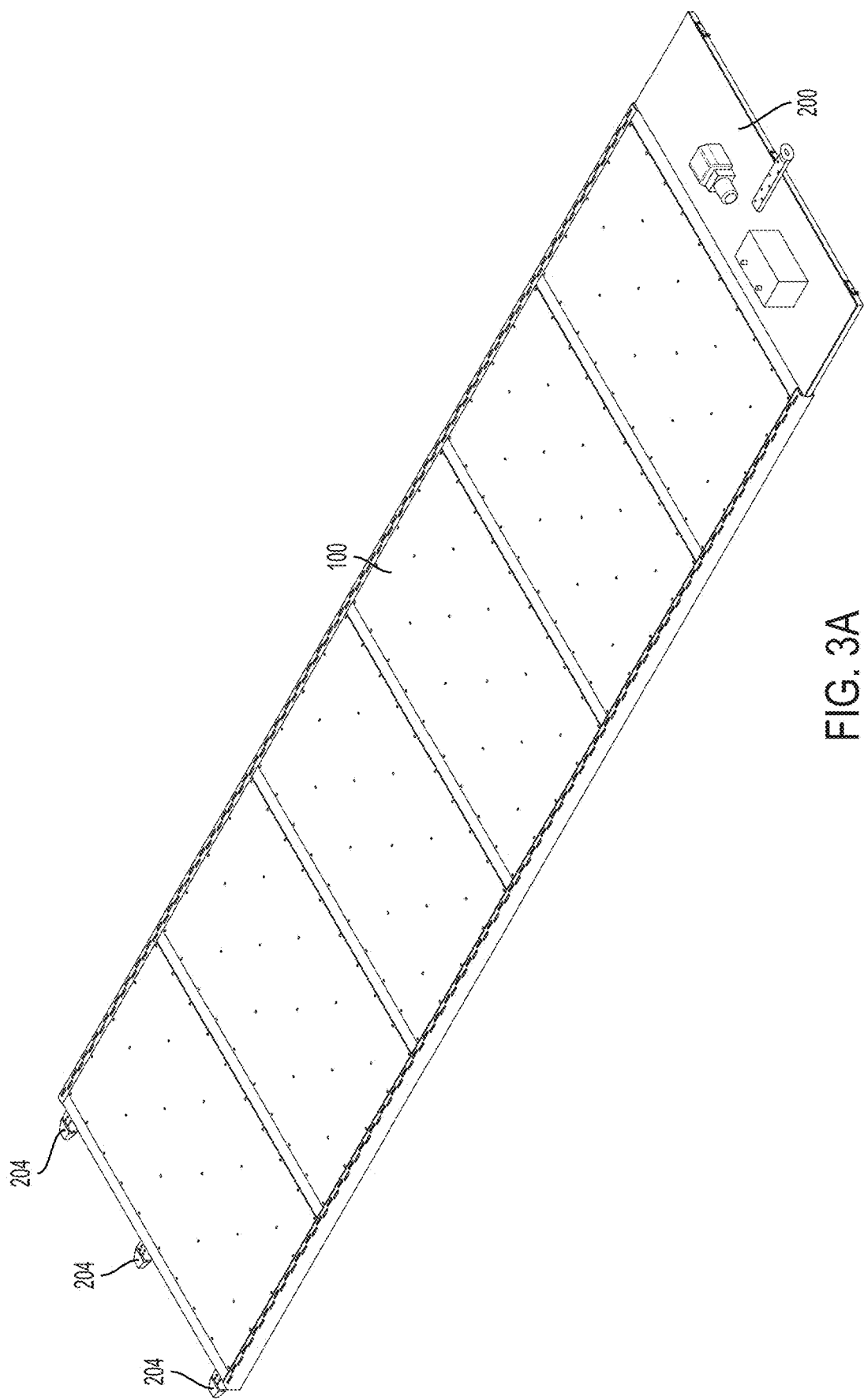
FIG. 3A depicts a perspective view of the MP inserted into the HASS.
Figure 3B:
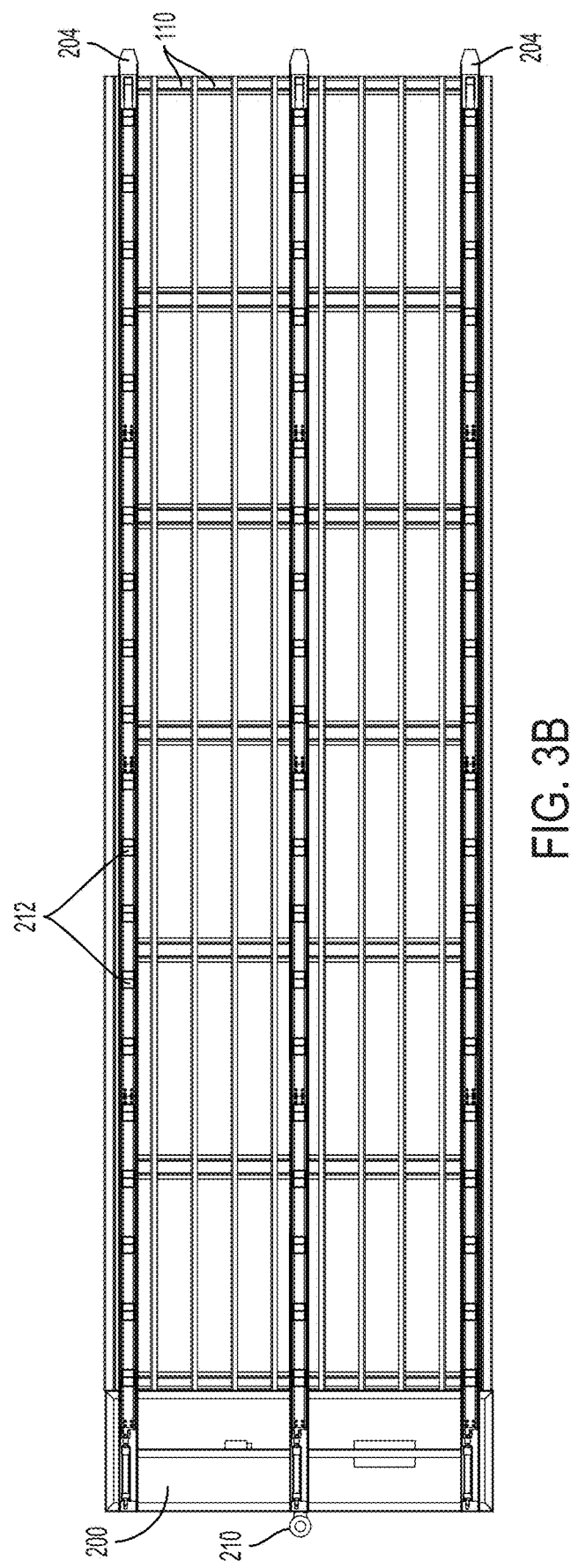
FIG. 3B depicts a bottom view of FIG. 3A.

FIG. 3A depicts a perspective view of HASS 200 inserted into MP 100. As shown, the tines 204 are inserted into support channels 110 which extend the entire length of MP 100. The distal ends of tines 204 can be seen protruding from support channels 110. For clarity, FIG. 3B depicts a bottom view of FIG. 3A showing tines 204 extending the entire length of support channels 110 and protruding from the end of MP 100.

Figure 4:
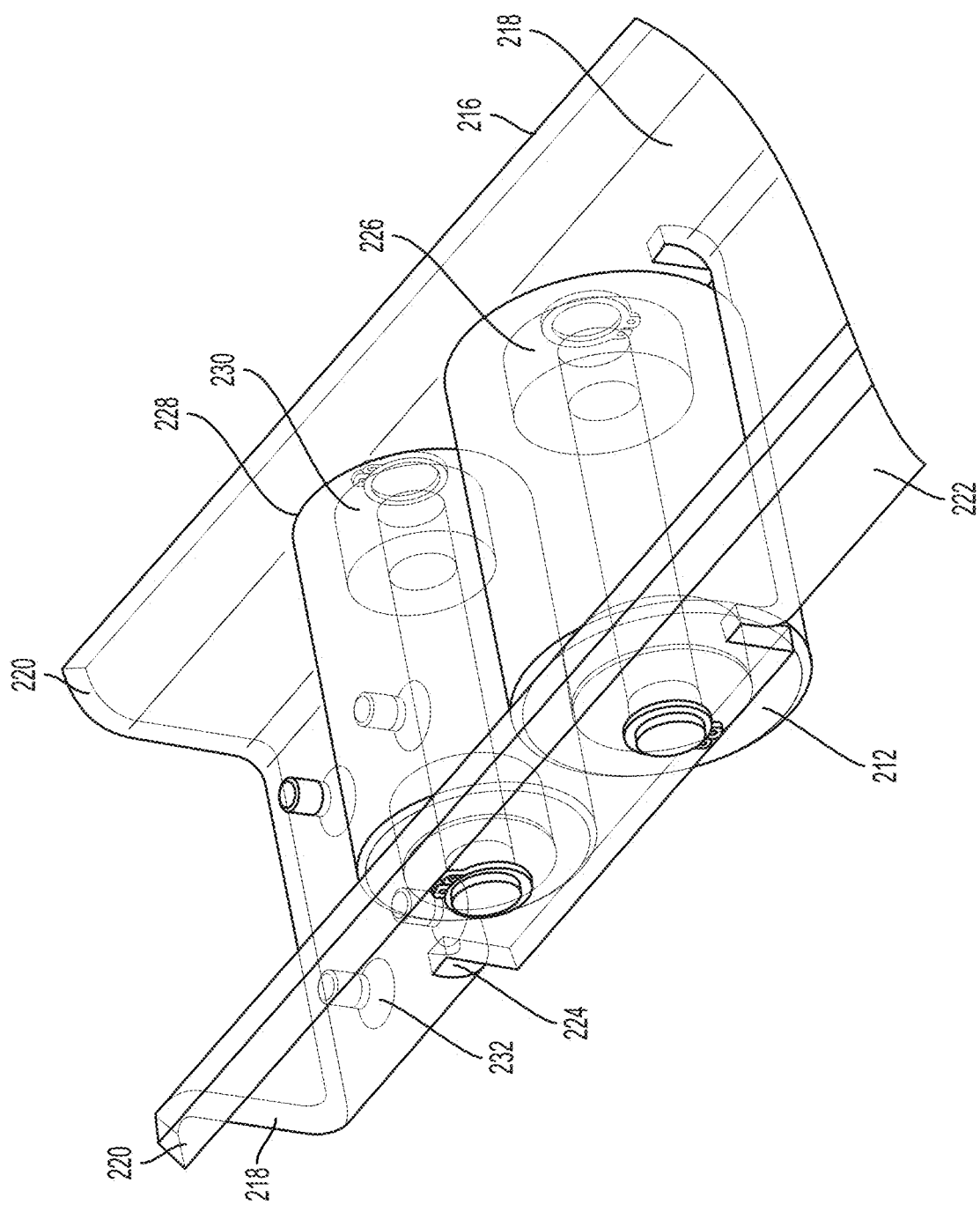
FIG. 4 depicts a cutaway view of the lower channel of a tine of the HASS.

Each tine 204 has the same construction. The tines 204 contain an upper channel 214 which is slidable relative to a lower interlocking channel 216 as will now be described. FIG. 4 depicts a perspective view of a portion of the lower channel 216 in isolation. Lower channel 216 generally has a rectangular cross-section. The upper portion of the lower channel 216 is bent outward (at 90° or curved) from sidewalls 218 to form shelf 220 on each side of lower channel 216. As will be shown later, shelf 220 prevents lower channel 216 being disengaged from upper channel 214 when the HASS 200 is actuated.

The bottom surface 222 of lower channel 216 comprises a plurality of openings 224 which allow rollers 212 to protrude from lower channel 216. Each roller 212 is rotatably connected to sidewalls 218 by roller axel 226. A second set of rollers, referred to as ramp rollers 228, are rotatably connected to sidewalls 218 by ramp axel 230 near each ramp (in upper channel 214) as will be described. Each ramp roller 228 is preferably smaller in diameter than rollers 212 and does not extend through openings 224. However, ramp axel 230 is situated at a higher location along sidewalls 218 than roller axel 226 so that only the top surface of ramp rollers 228 contacts upper channel 214 and so that rollers 212 do not contact upper channel 214.

Lower channel 216 may be formed from a single piece of bent metal having a plurality of openings 224 along bottom surface 222 to accommodate rollers 212 or may be made from multiple joined sections as would be obvious to one of ordinary skill in the art. For example, bolt holes 232, shown in FIG. 4, may be used to connect the depicted section of lower channel 216 to another section using a plate bolted to both sections. Any construction method may be used for lower channel 216 as long as it remains rigid for its entire length because a force must be applied longitudinally its entire length when HASS 200 is actuated as will be described later.

Figure 5:
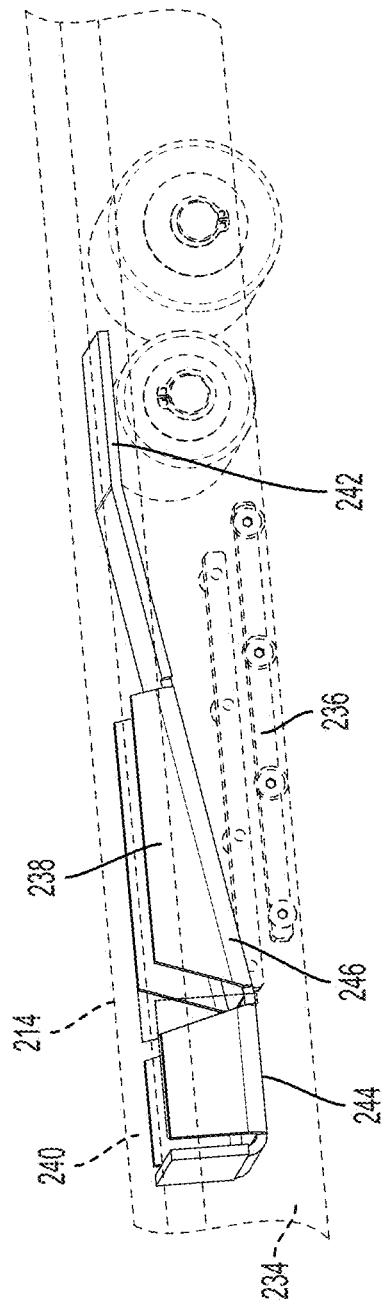
FIG. 5 depicts a cutaway view of the upper channel of a tine of the HASS.

FIG. 5 depicts a perspective cutaway view of upper channel 214 in isolation. As shown, upper channel 214 also has a similar rectangular shaped cross-section to lower channel 216. The dimensions of upper channel 214 are slightly larger than that of lower channel 216 so that sidewalls 234 can accommodate shelves 220. Periodically, along a lower portion of sidewalls 234 along an interior of upper channel 214, are affixed stoppers 236 which prevent upper channel 214 from separating from lower channel 216. Specifically, stoppers 236 prevent shelves 220 from further expansion during actuation of tines 204.

A plurality of ramp assemblies 238 are affixed to an upper surface 240 above ramp rollers 228 as will be shown later. Before actuation of HASS 200, ramp rollers 228 contact flat surfaces 242 of ramp assemblies 238. And, after actuation of HASS 200, ramp rollers 228 contact flat surface 244 of ramp assemblies 238 after rolling along ramp sections 246 of ramp assemblies 238. This causes tines 204 to expand, thereby lifting MP 100 off the ground for conveyance.

Figure 6:
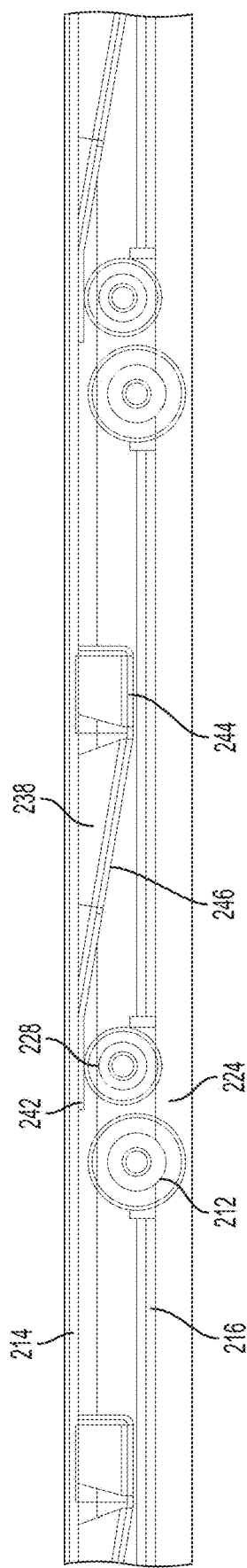
FIG. 6 depicts a side cross-sectional view of a portion of a tine.
Figure 7:
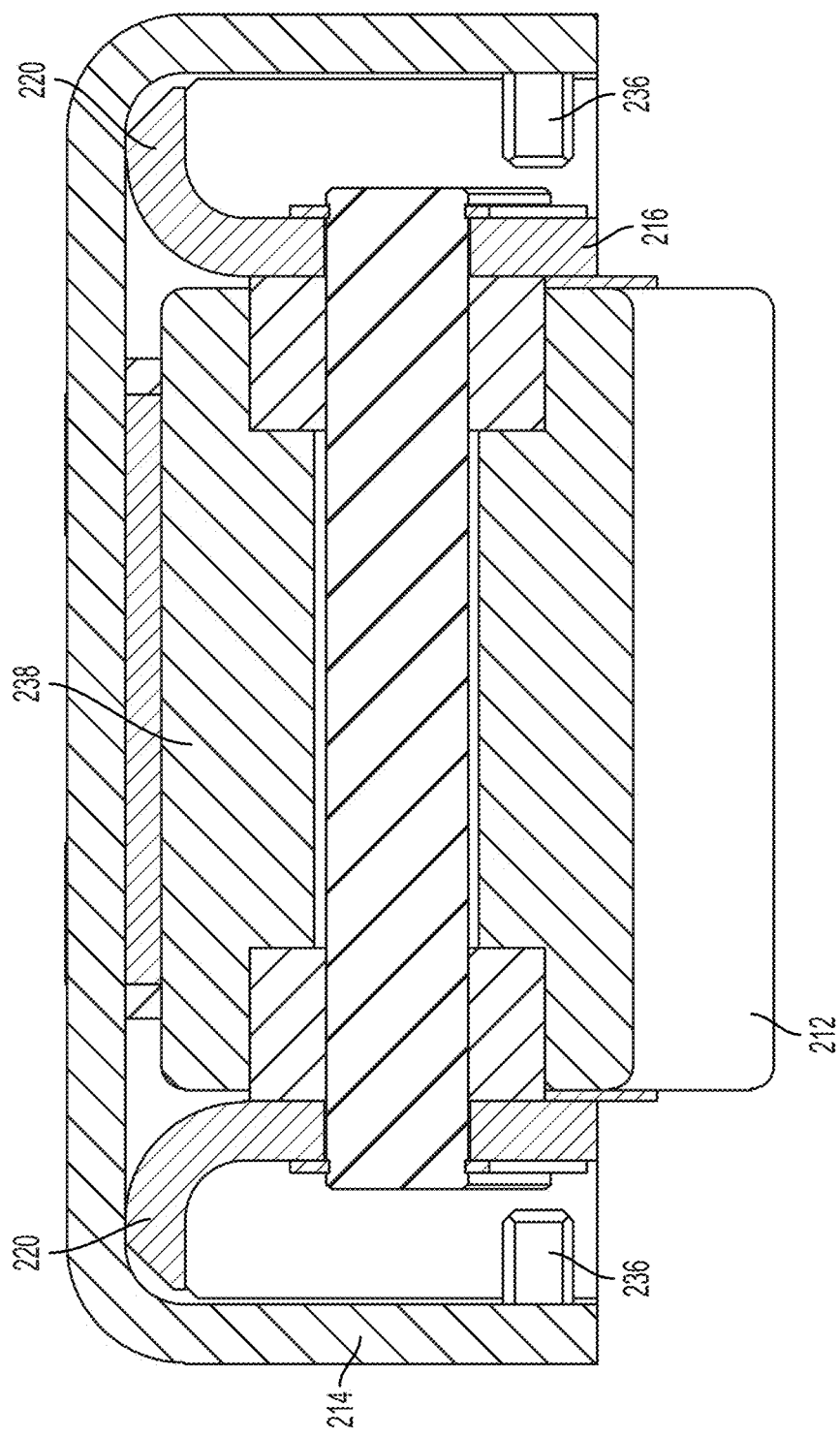
FIG. 7 depicts a front cross-sectional view of a portion of a tine.

FIG. 6 shows a cross-sectional side view of upper channel 214 and lower channel 216 assembled before HASS 200 is actuated. This view shows the location of the internal members of upper channels 214 and lower channel 216 before actuation. FIG. 7 depicts a cross-sectional view of upper channel 214 and lower channel 216 taken along a plane perpendicular to that of FIG. 6. FIG. 7 better depicts how stoppers 236 prevent shelves 220 from further expansion during actuation of HASS 200.

Figure 8A:
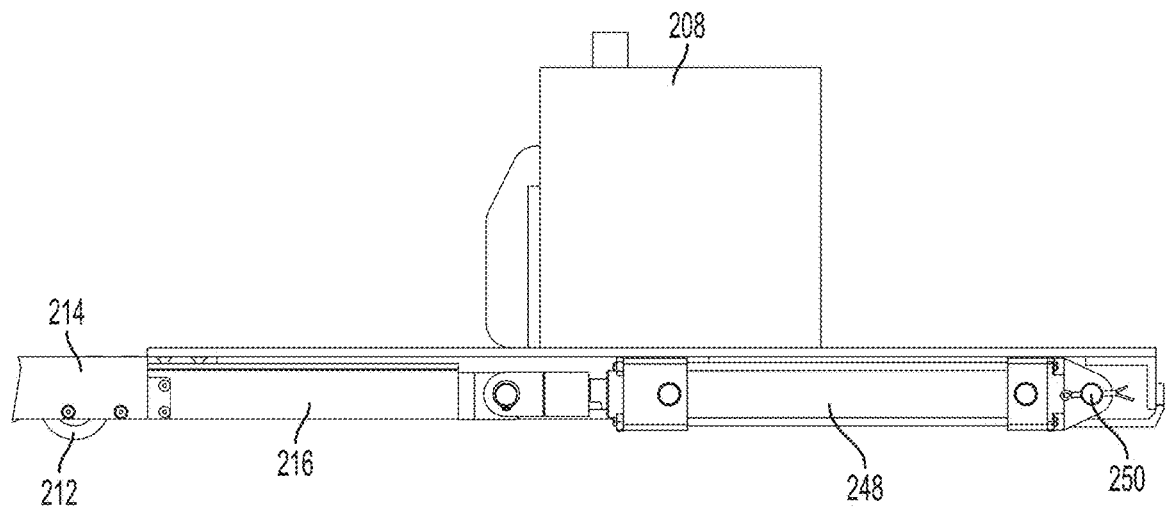
FIGS. 8A and 8B depict the piston of the HASS being activated.

The steps required to actuate HASS 200 will now be described first with reference to FIGS. 8A and 8B. As shown in FIG. 8A, hydraulic assembly 208 is able to actuate piston 248. A piston 248 is connected to teach tine 204 at platform 202. A first end of piston 248 is connected to platform 202 by pivot joint 250 and a second end of piston 28 is connected to lower channel 216. As has already been described, upper channel 214 of each tine 204 is rigidly connected to platform 202.

Figure 8B:
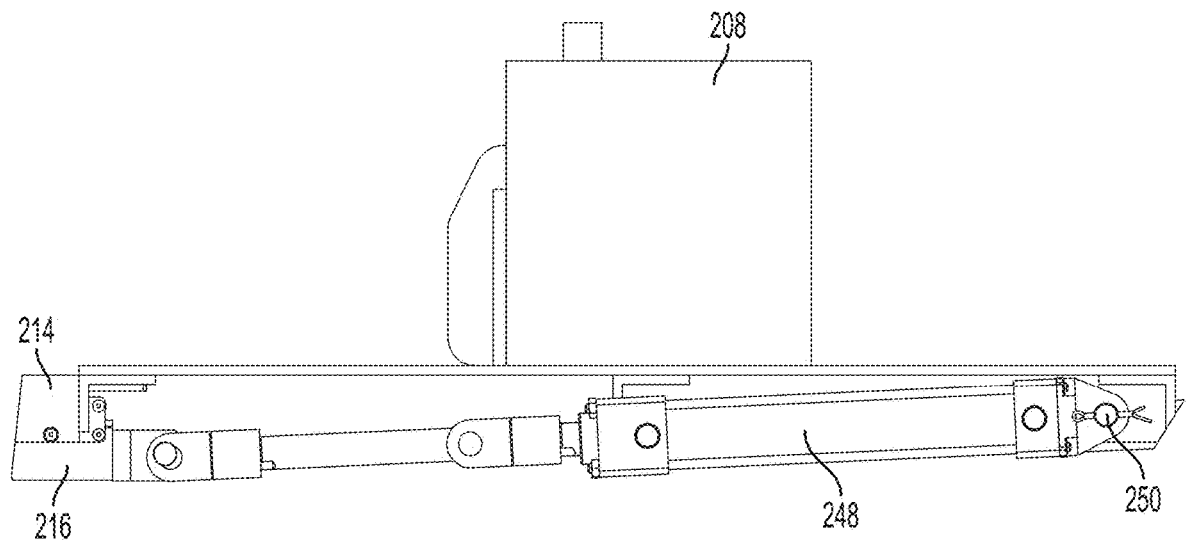

The expansion of pistons 248 is depicted in FIG. 8B. As hydraulic assembly 208 causes each piston 248 to expand, a longitudinal force is extended to lower channel 214, causing ramp rollers 228 to roll from surface 242 to 244. The rigid connection of upper channel 214 to platform 202 prevents any movement of upper channel 214. The expansion of pistons 248 thus causes the expansion of tines 204 and the lifting of MP 100. In order to accommodate the expansions, pistons 248 pivot about pivot joint 250 as depicted in FIG. 8B.

A cross-section view of upper channel 214 and lower channel 216, similar to that of FIG. 7, is depicted in FIG. 9 showing tine 204 in a full expanded position. As shown, stoppers 236 prevent any further expansion of tines 204 by catching shelves 220.

After pistons 248 are expanded, MP 100 can be conveyed using a conveyance vehicle which interfaces with attachment 210. After MP 100 has been conveyed, it can be lowered by releasing the hydraulic pressure in pistons 248 allowing them to contract, causing ramp roller 228 to roll to flat surface 242 and the tines 204 to collapse. Tines 204 can then be withdrawn from support channels 110.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A hydraulically actuated skate system comprising:
a movable platform,
wherein the movable platform comprises a plurality of channels on an underside of the movable platform, and
wherein each channel has open ends and extends an entire length of the movable platform; and
a hydraulically actuated skate comprising:
a platform;
a plurality of tines coupled to the platform,
wherein a length of each tine is greater than or equal to the entire length of the movable platform,
wherein a width of each tine is less than or equal to a width of each channel,
wherein each tine comprises:
an upper channel having a plurality of ramp assemblies; and
a lower channel having a plurality of rollers and ramp rollers,
wherein the lower channel is slidingly received with the upper channel; and
a hydraulic assembly coupled to each tine, wherein actuation of the hydraulic assembly causes the ramp rollers to roll along the ramp assemblies, causing expansion of each tine from a first height to a second height,
wherein the upper channel has an open-ended rectangular cross-section and the lower channel has an inverted open-ended rectangular cross-section relative to the upper channel,
wherein an upper edge of sidewalls of the lower channel are bent outward to form an outward extending shelf which is curved, and
wherein a lower portion of interior sidewalls of the upper channel comprise a plurality of periodically spaced inward extending locking elements.

2. The hydraulically actuated skate system according to claim 1, wherein the upper channel of each tine is fixed to the platform.

3. The hydraulically actuated skate system according to claim 2, wherein the lower channel of each time is pivotally connected to a first end of a hydraulic cylinder of the hydraulic assembly, and
wherein a second end of the hydraulic cylinder is pivotally connected to an underside of the platform.

4. The hydraulically actuated skate system according to claim 3,
wherein expansion of the hydraulic cylinder causes the lower channel to slide relative to the upper channel.

5. The hydraulically actuated skate system according to claim 1, wherein the rollers have a larger diameter than the ramp rollers.

6. The hydraulically actuated skate system according to claim 1,
wherein the rollers and the ramp rollers are rotatably connected to sidewalls of the lower channel.

7. The hydraulically actuated skate system according to claim 6,
wherein a top surface of each ramp rollers is located above a top surface of the rollers.

8. The hydraulically actuated skate system according to claim 7,
wherein the top surface of the rollers never engage the ramp assemblies.

9. The hydraulically actuated skate system according to claim 1,
wherein engagement of the outward extending shelf with the inward extending locking elements prevents further expansion of the upper channel and lower channel.

10. The hydraulically actuated skate system according to claim 1, wherein each ramp assembly is located above a single ramp roller.

11. The hydraulically actuated skate system according to claim 10, wherein each ramp assembly comprises:
a first flat surface;
a second flat surface; and
an angled ramp surface connecting the first flat surface to the second flat surface.

12. The hydraulically actuated skate system according to claim 11,
wherein each ramp roller is located below the first flat surface before actuation of the hydraulic assembly, and wherein each ramp roller is located below and in contact with the second flat surface after actuation of the hydraulic assembly.

\* \* \* \* \*

UNITED STATES PATENT AND TRADEMARK OFFICE
CERTIFICATE OF CORRECTION

PATENT NO. : 10,618,753 B2
APPLICATION NO. : 15/798801
DATED : April 14, 2020
INVENTOR(S) : Stonie Hopkins et al.

It is certified that error appears in the above-identified patent and that said Letters Patent is hereby corrected as shown below:

In the Claims

Claim 3, Column 6, Line 24: "the lower channel of each time is pivotally" should be indicated as
-- --the lower channel of each tine is pivotally-- --.

Signed and Sealed this
Nineteenth Day of September, 2023

*Katherine Kelly Vidal*
*Director of the United States Patent and Trademark Office*